United States Patent
Matsuo (10) Patent No.: US 8,077,733 B2
(45) Date of Patent: Dec. 13, 2011

(54) VEHICLE GATEWAY DEVICE, A COMMUNICATION DATA CONTROL METHOD AND COMPUTER PROGRAM PRODUCT THEREFOR

(75) Inventor: Tomoki Matsuo, Yokkaichi (JP)

(73) Assignee: Sumitomo Wiring Ssytems, Ltd. (JP)

( * ) Notice: Subject to any disclaimer, the term of this patent is extended or adjusted under 35 U.S.C. 154(b) by 224 days.

(21) Appl. No.: 12/133,430

(22) Filed: Jun. 5, 2008

(65) Prior Publication Data

US 2008/0304502 A1   Dec. 11, 2008

(30) Foreign Application Priority Data

Jun. 7, 2007 (JP) ................................. 2007-151296

(51) Int. Cl.
H04L 12/28 (2006.01)
(52) U.S. Cl. ......................................................... 370/401
(58) Field of Classification Search .................. None
See application file for complete search history.

(56) References Cited

U.S. PATENT DOCUMENTS

| | | | | | |
|---|---|---|---|---|---|
| 5,856,976 | A | * | 1/1999 | Hirano | 370/401 |
| 6,023,232 | A | * | 2/2000 | Eitzenberger | 340/988 |
| 6,114,970 | A | * | 9/2000 | Kirson et al. | 340/825.52 |
| 6,144,905 | A | * | 11/2000 | Gannon | 701/36 |
| 6,201,316 | B1 | * | 3/2001 | Knecht | 307/10.1 |
| 6,654,669 | B2 | * | 11/2003 | Eisenmann et al. | 701/1 |
| 2003/0117298 | A1 | | 6/2003 | Tokunaga et al. | |
| 2003/0223436 | A1 | * | 12/2003 | Lohrmann et al. | 370/401 |
| 2005/0004735 | A1 | * | 1/2005 | Kelly et al. | 701/50 |
| 2006/0271694 | A1 | * | 11/2006 | Matsuo et al. | 709/229 |
| 2006/0287784 | A1 | * | 12/2006 | Kanki | 701/29 |

* cited by examiner

Primary Examiner — Ayaz Sheikh
Assistant Examiner — Faiyazkhan Ghafoerkhan
(74) Attorney, Agent, or Firm — Gerald E. Hespos; Michael J. Porco (57) ABSTRACT

A vehicle gateway device is provided with a relay function unit (11) for relaying communication data to a bus line (BL2) if communication data flowing on a bus line (BL1) is relay data to be relayed to a bus line (BL2) and a (NM) function unit (21) for performing a specified network management process in accordance with (NM) data if the communication data flowing on the bus line (BL1) is (NM) data transmitted for the implementation of an (NM) function. The relay function unit (11) is constructed by an (ASIC) and the (NM) function unit (21) is constructed by a microcomputer.

8 Claims, 10 Drawing Sheets

| | LABEL PORTION | FUNCTION | DATA PORTION |
|---|---|---|---|
| NM FUNCTION | ACTIVE | ACTIVE | |
| | SLEEP | SLEEP | |
| | WAKEUP | WAKEUP | |
| RELAY FUNCTION | HL-SW | HEAD LIGHT SWITCH | ON-OFF |
| | WIP-SW | WIPER SWITCH | ON-OFF |
| | VSD | VEHICLE SPEED SIGNAL | VEHICLE SPEED DATA |

| LABEL PORTION | FUNCTION | DATA PORTION |
|---|---|---|
| NM | ACTIVE | ACTIVE |
| | SLEEP | SLEEP |
| | WAKEUP | WAKEUP |
| HL-SW | HEAD LIGHT SWITCH | ON-OFF |
| WIP-SW | WIPER SWITCH | ON-OFF |
| VSD | VEHICLE SPEED SIGNAL | VEHICLE SPEED DATA |

NM FUNCTION (rows: NM)
RELAY FUNCTION (rows: HL-SW, WIP-SW, VSD)

VEHICLE GATEWAY DEVICE, A COMMUNICATION DATA CONTROL METHOD AND COMPUTER PROGRAM PRODUCT THEREFOR

BACKGROUND OF THE INVENTION

1. Field of the Invention

The invention relates to a vehicle gateway device to be installed in an automotive vehicle, to a communication data control method and to a computer program product therefor.

2. Description of the Related Art

A vehicle gateway device for an automotive vehicle includes a relay function unit and a network management function unit. The relay function unit judges whether communication data flowing on a bus line connected with the vehicle gateway device is relay data and governs a relay function of transmitting this relay data on the bus line after amplification or the like. Since the relay data is frequently sent out from a node of the bus line, a high speed process is required. The network management function unit performs a network management process in accordance with communication data flowing on the bus line if this communication data is network management data. However, network management data are received far less frequently than the relay data. Thus, processes of the network management function unit are not as fast as those of the relay function unit.

In the conventional vehicle gateway device, the relay function unit and the network management function unit are constructed by a microcomputer or an ASIC (Application Specific Integrated Circuit).

U.S Patent Application Publication No. 2003/0117298 discloses a vehicle gateway device capable of confirming the content of a data packet transmitted to an OEM bus 103 and an ITS data bus 105, determining whether this data packet is to be transferred to another bus according to the content thereof and ensuring traffic by eliminating the flow of unnecessary data.

U.S. Patent Application Publication No. 2003/0223436 discloses a network management system, in which a network manager switches a network segment off to switch subscriber units off if the subscriber units are not needed by another network segment.

However, if the relay function unit and the network management function unit are constructed by a microcomputer, a high-performance microcomputer needs to be employed to realize the relay function unit required to perform a high speed process. Such a high-performance microcomputer causes an overengineering problem for the network management function unit. On the other hand, if the relay function unit and the network management function unit are constructed only by an ASIC, there is a problem of being difficult to add a new function to the network management function unit. These problems are not solved easily because the network management function unit and the relay function unit are not constructed by different devices.

An object of the invention is to provide a vehicle gateway device and a control method to performing processes of a relay function unit and easily adding a new function to a network management function unit without employing a high-performance microcomputer.

SUMMARY OF THE INVENTION

The invention relates to a vehicle gateway device with a relay function unit for relaying communication data if communication data flowing on a bus line is relay data, and a network management function unit for performing a network management process in accordance with network management data if communication data flowing on the bus line is network management data transmitted for the implementation of a network management function. The relay function unit is constructed by an application specific integrated circuit, and the network management function unit is constructed by a microcomputer. As a result, the vehicle gateway device can perform processes of the relay function unit and can easily add a new function to the network management function unit without employing a high-performance microcomputer.

The relay function unit preferably has a first transmitting/receiving section for receiving communication data flowing on the bus line and transmitting the communication data to the bus line. A judging section judges whether the communication data received by the first transmitting/receiving section is the relay data or the network management data. A notifying section notifies the network management function unit if the judging section judges the reception of the network management data and/or notifies the first transmitting/receiving section relaying the relay data if the judging section judges the reception of the relay data.

The network management function unit preferably includes a second transmitting/receiving section for receiving communication data flowing on the bus line and transmitting the communication data to the bus line, and a processing section for performing the network management process in accordance with the network management data. The second transmitting/receiving section outputs the network management data to the processing section if the reception of the network management data is notified from the notifying section. The processing section performs the network management process in accordance with the network management data outputted from the second transmitting/receiving section.

The relay function unit preferably includes a first transmitting/receiving section for receiving communication data flowing on the bus line and transmitting the communication data to the bus line. A judging section judges whether the communication data received by the first transmitting/receiving section is the relay data or the network management data. A notifying section notifies the network management function unit if the judging section judges the reception of the network management data and notifies the first transmitting/receiving section relaying the relay data if the judging section judges the reception of the relay data. The network management function unit includes a second transmitting/receiving section for receiving communication data flowing on the bus line and transmitting the communication data to the bus line. A processing section for performing the network management process in accordance with the network management data. The second transmitting/receiving section outputs the network management data to the processing section if the reception of the network management data is notified from the notifying section and the processing section performs the network management process in accordance with the network management data outputted from the second transmitting/receiving section.

According to this construction, judgment as to whether the communication data is relay data or network management data is made by the relay function unit. Thus, the network management function unit need not judge whether the communication data is relay data or network management data. Accordingly, the process load of the network management function unit can be reduced and the network management function unit can be constructed by a microcomputer with a lower performance to promote lower cost.

The second transmitting/receiving section may discard the received relay data if the reception of the relay data is notified from the notifying section. Thus, it is possible to quickly discard unnecessary communication data, to reduce the capacity of a buffer for temporarily storing the communication data and to promote lower cost.

The relay function unit preferably has a first transmitting/receiving section for receiving communication data flowing on the bus line and transmitting the communication data to the bus line. A judging section judges whether the communication data received by the first transmitting/receiving section is the relay data or the network management data. At least one queue stores the relay data and the network management data.

The judging section preferably outputs communication data judged to be relay data to the queue and outputs communication data judged to be network management data to the network management function unit. The network management function unit performs the network management process in accordance with the network management data from the judging section.

The first transmitting/receiving section preferably successively transmits the communication data stored in the queue to the bus line.

According to this construction, the network management function unit does not directly receive the communication data flowing on the bus line. Thus, the number of nodes present in the network can be reduced. In other words, if the network management function unit directly receives communication data flowing on the bus line and the relay function unit directly receives communication data flowing on the bus line, each of the network management function unit and the relay function unit is counted as one node. Accordingly, by providing the queue in the relay function unit so that communication data are not directly received by the network management function unit, it becomes possible to reduce the node number by 1 and to reduce the node number in a vehicle network system with restriction on the node number.

After performing the network management process in accordance with the network management data, the network management function unit may output this network management data to the queue if necessary. In this way, the network management data can be relayed.

The queue preferably comprises a First In First Out (FIFO) memory for storing the relay data and the network management data to be transmitted from the transmitting/receiving section.

The communication data preferably includes a label portion for storing data indicating the network management data and data indicating the type of the relay data. Accordingly, the process of judging whether the communication data is the network management data or the relay data can be simplified. In other words, if the data indicating the network management data is not stored in the label portion and, instead, data indicating the type of the network management data is stored in the label portion, the judging section needs to store a table or the like relating the data indicating types of the network management data to data indicating whether the communication data is the network management data and to perform the process of judging whether the communication data is the relay data or the network management data by referring to this table. Thus, the judging process is complicated and a memory space for storing this table has to be ensured. If the data indicating the network management data is stored in the label portion as in the present invention, the judging section need not store the table, thereby saving the memory space, and the process can be simplified.

The invention also relates to a communication data control method for controlling communication data flowing on a bus line, in particular for use with a vehicle gateway device as described above. The method preferably comprises relaying communication data by means of a relay function unit constructed by an application specific integrated circuit, if communication data flowing on the bus line is relay data, and performing a network management process in accordance with network management data by means of a network management function unit constructed by a microcomputer if communication data flowing on the bus line is network management data transmitted for the implementation of a network management function.

The step of relaying communication data preferably comprises receiving communication data flowing on the bus line and transmitting the communication data to the bus line, judging whether the communication data received is relay data or network management data, and notifying the network management function unit if the reception of the network management data is judged and/or relaying the relay data if the reception of the relay data is judged.

The step of performing a network management process preferably comprises receiving communication data flowing on the bus line and transmitting the communication data to the bus line, and performing the network management process in accordance with the network management data. The step may further include outputting network management data to a processing section to be processed if the reception of the network management data is notified and performing the network management process in the processing section in accordance with the network management data outputted.

The method may further include discarding the received relay data if the reception of the relay data is notified.

The step of relaying communication data may further comprise receiving communication data flowing on the bus line and transmitting the communication data to the bus line, judging whether the communication data received is the relay data or the network management data, and storing in at least one queue the relay data and the network management data.

The method may include outputting to the queue communication data judged to be relay data and outputting to the network management function unit communication data judged to be the network management data. The network management function unit performs the network management process in accordance with the network management data outputted.

The method may include successively transmitting to the bus line the communication data stored in the queue.

The communication data includes a label portion for storing data indicating the network management data and data indicating the type of the relay data.

The invention also relates to a computer program product tangibly embodied on a computer-readable medium and/or embodied as a signal and/or data stream, comprising computer readable instructions which, when loaded and executed on a suitable system, such as the above-described vehicle gateway device, perform the steps of the above-described communication data control method.

Accordingly, since the relay function unit is constructed by the application specific integrated circuit and the network management function unit is constructed by the microcomputer, there can be provided a vehicle gateway device capable of sufficiently performing processes of the relay function unit and easily adding a new function to the network management function unit even without employing a high-performance microcomputer.

These and other objects, features and advantages of the present invention will become more apparent upon reading of the following detailed description of preferred embodiments and accompanying drawings. It should be understood that even though embodiments are separately described, single features thereof may be combined to additional embodiments.

BRIEF DESCRIPTION OF THE DRAWINGS

FIGS. 4(a)-(c) are diagrams showing the operation of the vehicle gateway device, wherein

DETAILED DESCRIPTION OF THE PREFERRED EMBODIMENTS

Figure 1:
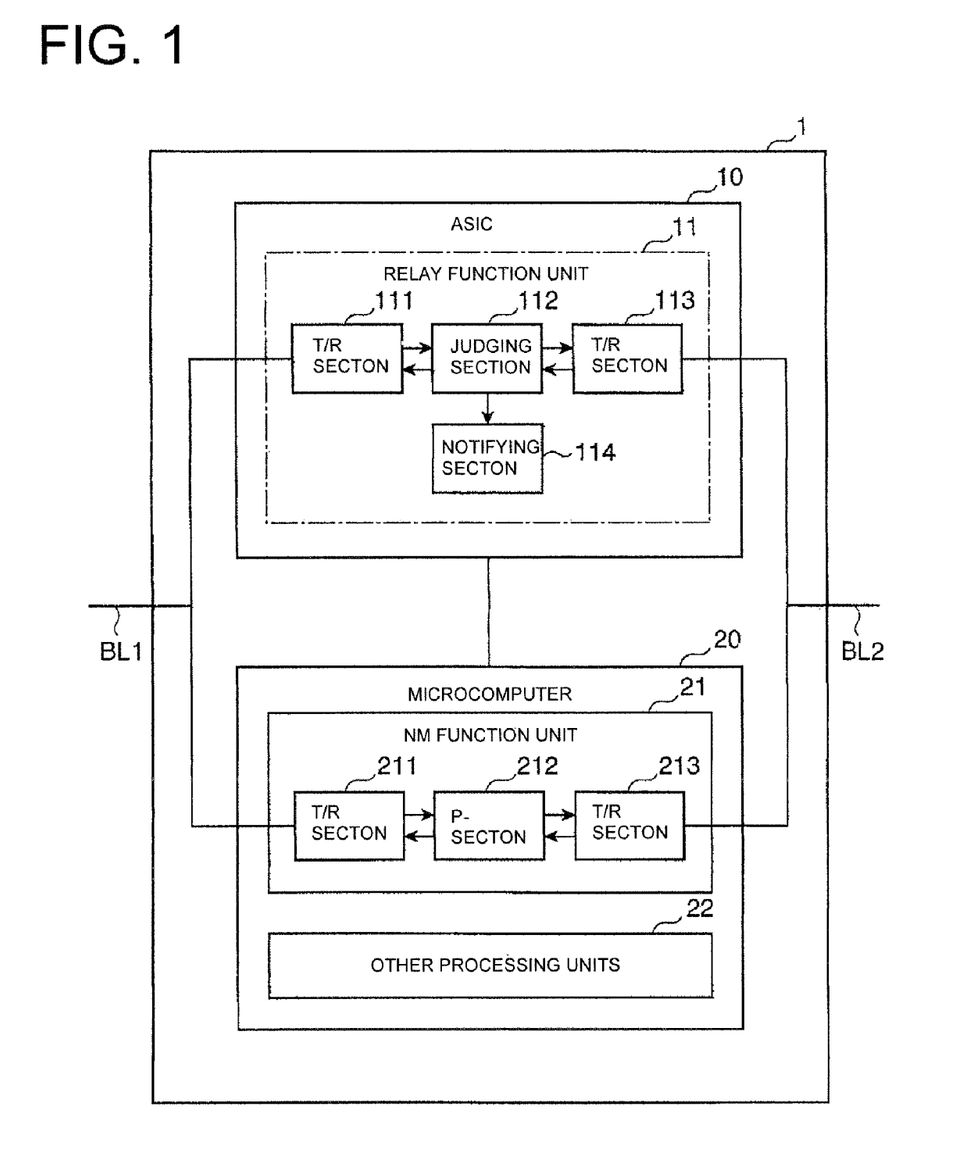
FIG. 1 is a block diagram of a vehicle gateway device according to a first embodiment of the invention.

FIG. 1 is a block diagram of the vehicle gateway device 1 according to a first embodiment of the invention. The vehicle gateway device 1 is to be installed in an automotive vehicle for relaying communication data flowing on a bus line BL1 as a preferred low-speed bus line and a bus line BL2 as a preferred high-speed bus line constituting a vehicle network. The bus line BL1 preferably is for transmitting communication data, for example, at a data transfer speed of about 50 kbit/s, specifically for transmitting data used to control devices in a body transmission system of the automotive vehicle such as lights, wipers and door locks. The bus line BL2 preferably is for transmitting communication data, for example, at a data transfer speed which is higher than that of the bus line BL1 (preferably more than about twice higher), more preferably at a data transfer speed of about 200 kbit/s to 1 Mbit/s, specifically for transmitting data used to control an engine, a transmission, a brake and/or the like, digital AV data, etc. A CAN (Controller Area Network) is employed as a vehicle network in this embodiment, D2B, MOST, FlexRay, LIN or the like may be employed instead of the CAN.

The vehicle gateway device 1 is provided with an Application-specific Integrated Circuit (ASIC) 10 and a microcomputer 20. The ASIC 10 as a customized integrated circuit includes at least one relay function unit 11. The relay function unit 11 includes a transmitting/receiving section 111 (first transmitting/receiving section), a judging or evaluating section 112, a transmitting/receiving section 113 (first transmitting/receiving section) and a notifying section 114.

The transmitting/receiving section 111 preferably includes a buffer or the like, receives communication data flowing on the bus line BL1, (at least temporarily) stores them in the buffer and transmits communication data to the bus line BL1.

Figure 2:
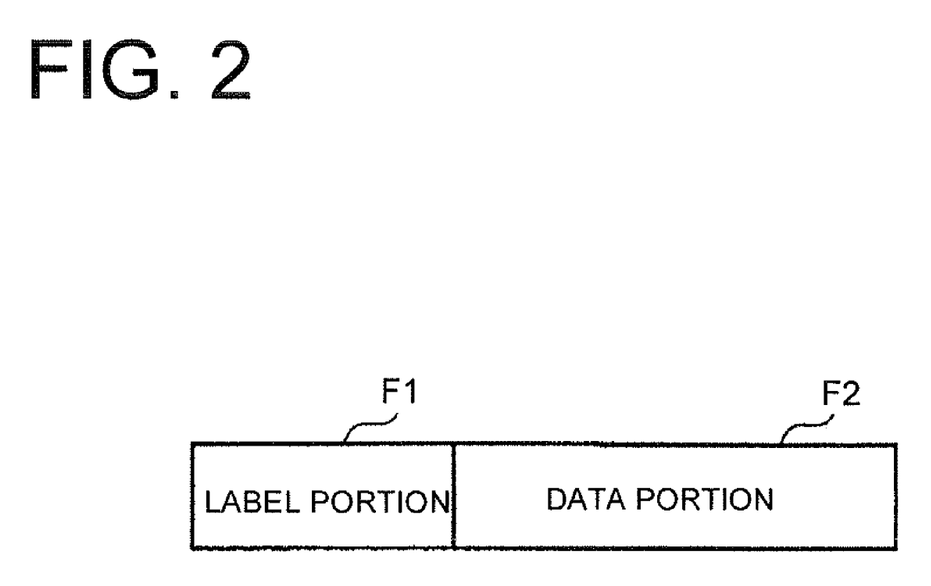
FIG. 2 is a diagram showing a data format of communication data received by a receiving section.
Figure 3:
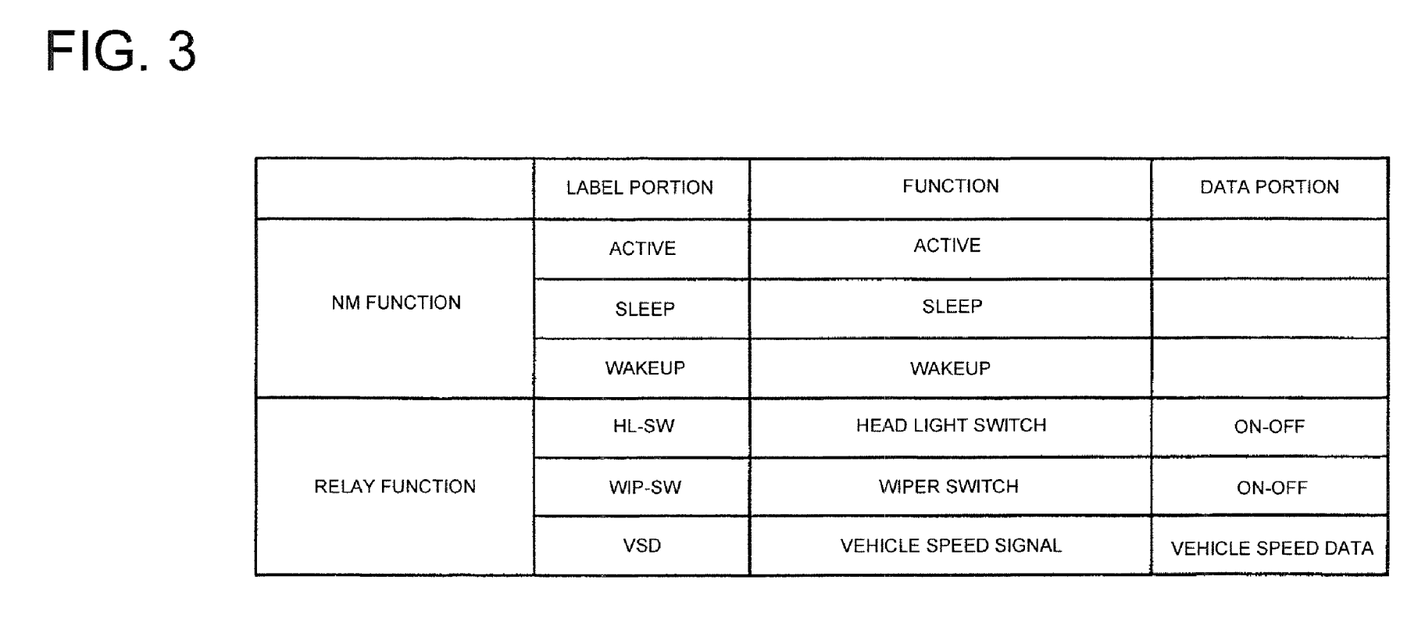
FIG. 3 is a chart showing types of data included in communication data.

FIG. 2 is a diagram showing a data format of communication data to be received by the transmitting/receiving section 111, and FIG. 3 is a chart showing preferred types of communication data. Each communication data includes a label portion F1 and a data portion F2 as shown in FIG. 2.

The label portion F1 stores data indicating the type of the communication data. Specifically, any one or more of data "ACTIVE", "SLEEP", "WAKEUP", "HL-SW", "WIP-SW" and/or "VSD" shown in FIG. 3 is or may be stored in the label portion F1. The communication data, in which "SLEEP" is stored in the label portion F1, represents a SLEEP command for setting the vehicle gateway device 1 to a low or zero power consumption mode (sleep mode). The communication data, in which "WAKEUP" is stored in the label portion F1, represents a WAKEUP command for setting the vehicle gateway device 1 in the sleep mode to a normal operation mode. Here, if the vehicle gateway device 1 is set to the normal operation mode, the power consumption of the vehicle gateway device 1 has a rated value. The communication data, in which "ACTIVE" is stored in the label portion F1, represents ACTIVE data regularly transmitted by nodes connected with the vehicle network. This ACTIVE data is for notifying to other nodes that a node at a transmitting end is capable of transmitting data. If the ACTIVE data is no longer transmitted, a defect that the node, which is supposed to transmit this ACTIVE data, is in trouble or the bus line connected with this node is broken can be detected.

The communication data, in which "HL-SW" is stored in the label portion F1, represents a command for controlling a load switch such as a head light switch. The head light switch is turned off if "ON-OFF" is stored in the data portion F2, whereas it is turned on if "OFF-ON" is stored in the data portion F2.

The communication data, in which "WIP-SW" is stored in the label portion F1, represents a command for controlling another load switch such as a wiper switch. The wiper switch is turned off if "ON-OFF" is stored in the data portion F2, whereas it is turned on if "OFF-ON" is stored in the data portion F2.

The communication data, in which "VSD" is stored in the label portion F1, represents a vehicle speed signal for setting a variable (such as the speed) of the automotive vehicle, and a speed stored in the data portion F2 is, for example, a target value (e.g. a target speed) of the automotive vehicle.

The ACTIVE command, the SLEEP command and the WAKEUP command are network management data (hereinafter, "NM data") for implementing network management functions (hereinafter, "NM functions"), whereas the HL-SW command, the WIP-SW command and the VSD command are relay data.

Although three types of NM data are shown in FIG. 3, they are merely examples. Four or more types of NM data are actually present and a NM function unit 21 can implement NM functions corresponding to the types of the NM data.

The judging section 112 judges whether or not the communication data received by the transmitting/receiving section 111, 113 are relay data or NM data. Here, the judging section 112 judges that the communication data is relay data if the data indicating the type of the relay data is stored in the label portion F1 of the received communication data while judging that the communication data is NM data if the data indicating the type of the NM data is stored in the label portion F1 of the received communication data.

The judging section 112 outputs the relay data to the transmitting/receiving section 113 in the case of judging that the communication data received by the transmitting/receiving section 111 is the relay data. On the other hand, the judging section 112 outputs the relay data to the transmitting/receiving section 111 in the case of judging that the communication data received by the transmitting/receiving section 113 is the relay data. In this way, the "HL-SW" command, the "WIP-SW" command or the "VSD" command as the relay data flowing on the bus line BL1 is relayed to the bus line BL2, and the relay data flowing on the bus line BL2 is relayed to the bus line BL1.

The transmitting/receiving section 113 includes a buffer or the like, receives communication data flowing on the bus line BL2, stores them in the buffer and transmits communication data to the bus line BL2.

If the reception of the NM data is judged by the judging section 112, the notifying section 114 notifies it to the NM function unit 21. Further, if the reception of the relay data is judged by the judging section 112, the notifying section 114 preferably notifies it to the NM function unit 21. More specifically, if the NM data or the relay data is received by the transmitting/receiving section 111, the notifying section 114 notifies it to a transmitting/receiving section 211. If the NM data or the relay data is received by the transmitting/receiving section 113, the notifying section 114 notifies it to a transmitting/receiving section 213.

A microprocessor 20 includes a CPU, a ROM, a RAM, the NM function unit 21 and/or other processing units 21. Here, the microprocessor 20 realizes the NM function unit 21 and the other processing units 22 by implementing a control program e.g. stored in the ROM. In the case of receiving the NM data, the NM function unit 21 implements the NM function in accordance with this NM data and includes the transmitting/receiving section 211, a processing section 212 and a transmitting/receiving section 213.

The transmitting/receiving section 211 includes a buffer, receives communication data flowing on the bus line BL1, stores them in the buffer and transmits communication data to the bus line BL1. If the reception of the NM data by the transmitting/receiving section 111 is notified from the notifying section 114, the transmitting/receiving section 211 outputs the communication data stored in the buffer as the NM data to the processing section 212. On the other hand, if the reception of the relay data by the transmitting/receiving section 111 is notified from the notifying section 114, the transmitting/receiving section 211 discards this communication data from the buffer.

The processing section 212 at least partly receives the NM data outputted from the transmitting/receiving section 211, implements the NM process in accordance with the NM data and outputs the NM data to the transmitting/receiving section 213 to transmit it to the bus line BL2. The processing section 212 also receives the NM data outputted from the transmitting/receiving section 213, implements a NM process in accordance with the NM data and outputs the NM data to the transmitting/receiving section 211 to transmit it to the bus line BL1.

The processing section 212 sets the vehicle gateway device 1 to the sleep mode for supplying power from a power supply only to some predetermined circuits of the vehicle gateway device 1 in the case of receiving the NM data representing the SLEEP command. The processing section 212 normally sets the vehicle gateway device 1 to the normal operation mode in the case of receiving the NM data representing the "WAKEUP" command.

The transmitting/receiving section 213 includes a buffer, receives communication data flowing on the bus line BL2, stores them in the buffer and transmits communication data to the bus line BL2. Here, if the reception of NM data by the transmitting/receiving section 113 is notified from the notifying section 114, the transmitting/receiving section 213 outputs the communication data stored in the buffer as the NM data to the processing section 212. On the other hand, if the reception of the relay data by the transmitting/receiving section 113 is notified from the notifying section 114, the transmitting/receiving section 213 discards this communication data from the buffer.

The other processing units 22 perform processes other than the NM functions, e.g. a process of governing control of the vehicle gateway device 1.

Figure 4A:
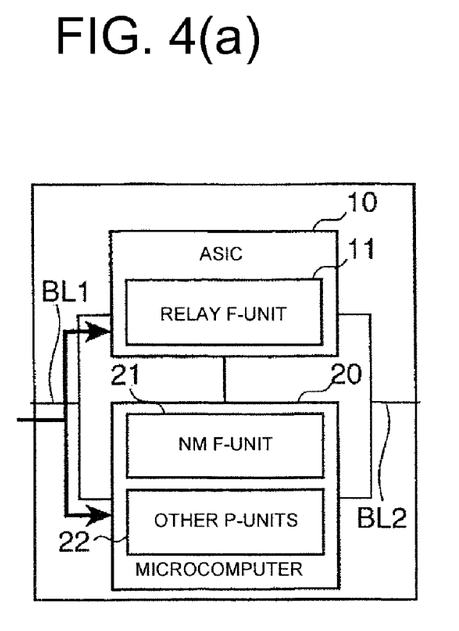
FIG. 4(a) shows a state at the time of receiving communication data.
Figure 4B:
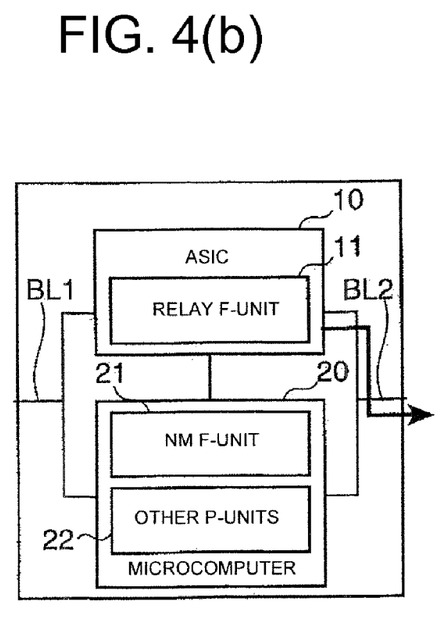
FIG. 4(b) shows a state at the time of relaying the communication data and FIG. 4(c) shows a state at the time of performing a NM function.
Figure 4C:
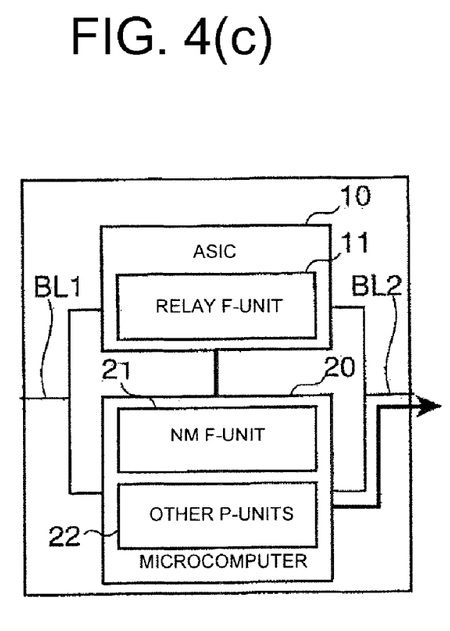

FIGS. 4(a)-4(c) are diagrams showing the operation of the vehicle gateway device 1, wherein FIG. 4(a) shows a state at the time of receiving communication data, FIG. 4(b) shows a state at the time of relaying the communication data, and FIG. 4(c) shows a state at the time of implementing the NM function. Thick lines shown in FIGS. 4(a)-4(c) represent a data flow. First of all, as shown in FIG. 4(a), the communication data flowing on the bus line BL1 is received by the ASIC 10 and the microprocessor 20. Subsequently, as shown in FIG. 4(b), upon judging the reception of relay data, the relay function unit 11 transmits the relay data to the bus line BL2 to relay the relay data. On the other hand, as shown in FIG. 4(c), if the relay function unit 11 judges the reception of NM data, the NM function unit 21 performs a NM process in accordance with this NM data and transmits it to the bus line BL2. Similarly, when the communication data direction is from BL2 to BL1, the vehicle gateway device 1 transmits the relay data to the bus line BL1 if the relay data flowing on the bus line BL2 is received by the ASIC 10 and the microprocessor 20 while transmitting the NM data to the bus line BL1 if the NM data flowing on the bus line BL2 is received by the ASIC 10 and the microprocessor 20.

Figure 5:
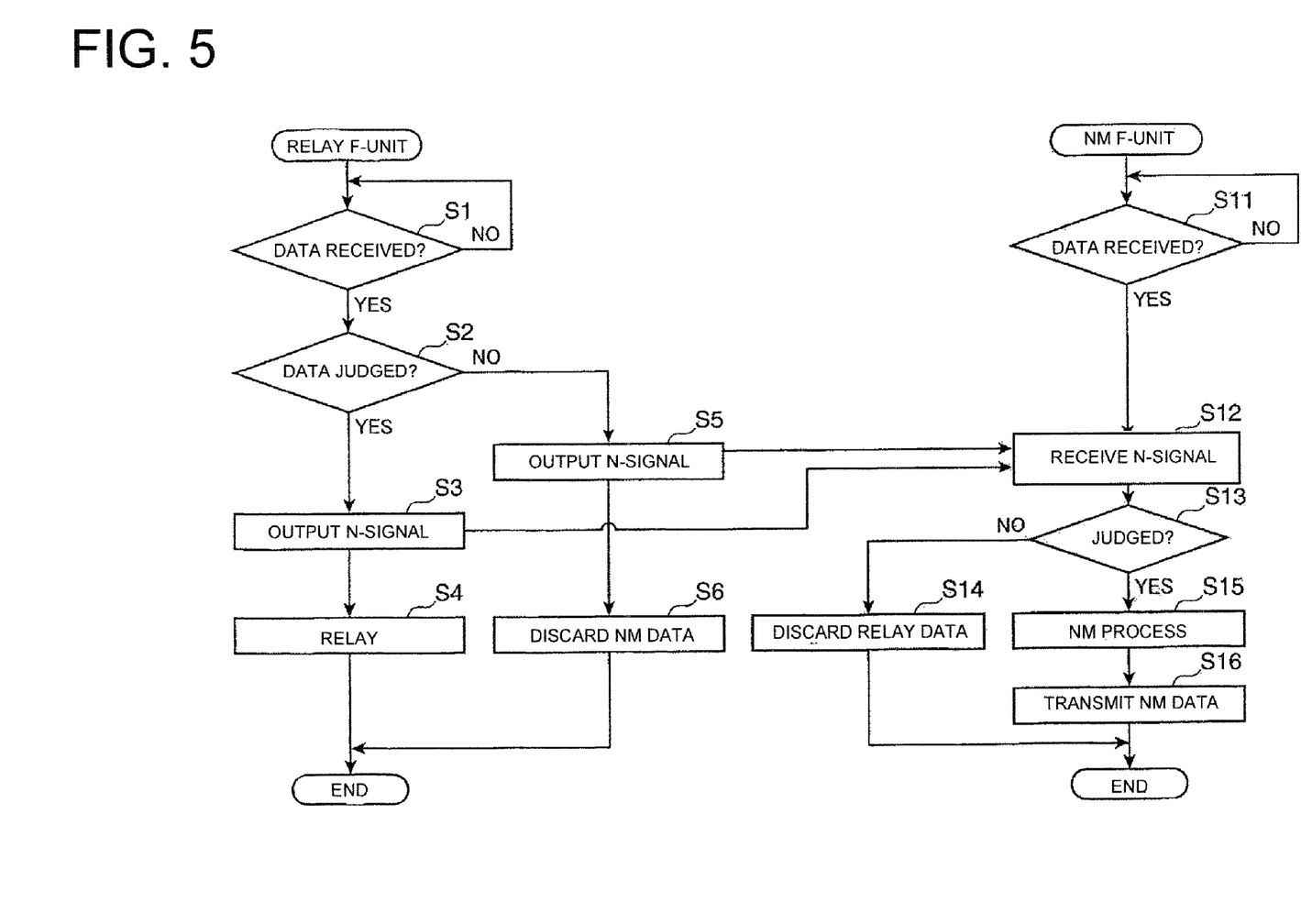
FIG. 5 is a flow chart showing the operation of the vehicle gateway device.

FIG. 5 is a flow chart showing the operation of the vehicle gateway device 1. The following flow chart is described by way of an example in the case of receiving data flowing on the bus line BL1. First of all, if the communication data flowing on the bus line BL1 is received by the transmitting/receiving section 111 of the relay function unit 11 in Step S1 (YES in Step S1), the judging section 112 judges whether this communication data is relay data or NM data (Step S2). Here, simultaneously with Step S1, the communication data flowing on the bus line BL1 is also received by the transmitting/receiving section 211 of the NM function unit 21 (YES in Step S11). On the other hand, the routine returns to Step S1 unless the communication data is received by the transmitting/receiving section 111 (NO in Step S1). Further, the routine returns to Step S11 unless the communication data is received by the transmitting/receiving section 211 in Step S11 (NO in Step S11).

If the judging section 112 judges that the communication data is relay data in Step S2 (YES in Step S2), the notifying section 114 outputs a notification signal indicating the reception of the relay data to the transmitting/receiving section 211 of the NM function unit 21 (Step S3).

In Step S4, the judging section 112 outputs communication data judged to be the relay data to the transmitting/receiving section 113 to transmit this communication data to the bus line BL2, and the transmitting/receiving section 213 transmits this communication data to the bus line BL2. In this way, the relay data is relayed from the bus line BL1 to the bus line BL2.

On the other hand, if the judging section 112 judges that the communication data is NM data in Step S2 (NO in Step S2), the notifying section 114 outputs a notification signal indicating the reception of the NM data to the transmitting/receiving section 211 of the NM function unit 21 (Step S5) and the transmitting/receiving section 111 discards this NM data from the buffer (Step S6).

In Step S12, the transmitting/receiving section 211 at least partly receives the notification signal outputted from the notifying section 114. If it is judged in Step S13 that the notification signal includes information representing the reception of the NM data (YES in Step S13), the transmitting/receiving section 211 outputs this NM data to the processing section 212, the processing section 212 performs the NM process in accordance with this NM data (Step S15) and the transmitting/receiving section 213 transmits this NM data to the bus line BL 2 (Step S16).

On the other hand, if it is judged or discriminated in Step S13 that the notification signal includes information representing the reception of the relay data (NO in Step S13), the transmitting/receiving section 211 discards this relay data from the buffer (Step S14).

As described above, the relay function unit 11 is in the ASIC 10 and the NM function unit 21 is in the microprocessor 20 in the vehicle gateway device 1. Thus, there can be provided the vehicle gateway device 1 capable of sufficiently performing the processes of the relay function unit 11 and easily adding a new function to the NM function unit 21 and the other processing units 22 even without employing a high-performance microprocessor. Here, in the case of adding a new function to the NM function unit 21 and the other processing units 22, the control program stored in the ROM may be rewritten. Although the relay function unit 11 is constructed by the ASIC in the above embodiment, it may be constructed by a FPGA (Field Programmable Gate Array) without being limited to this.

Figure 6:
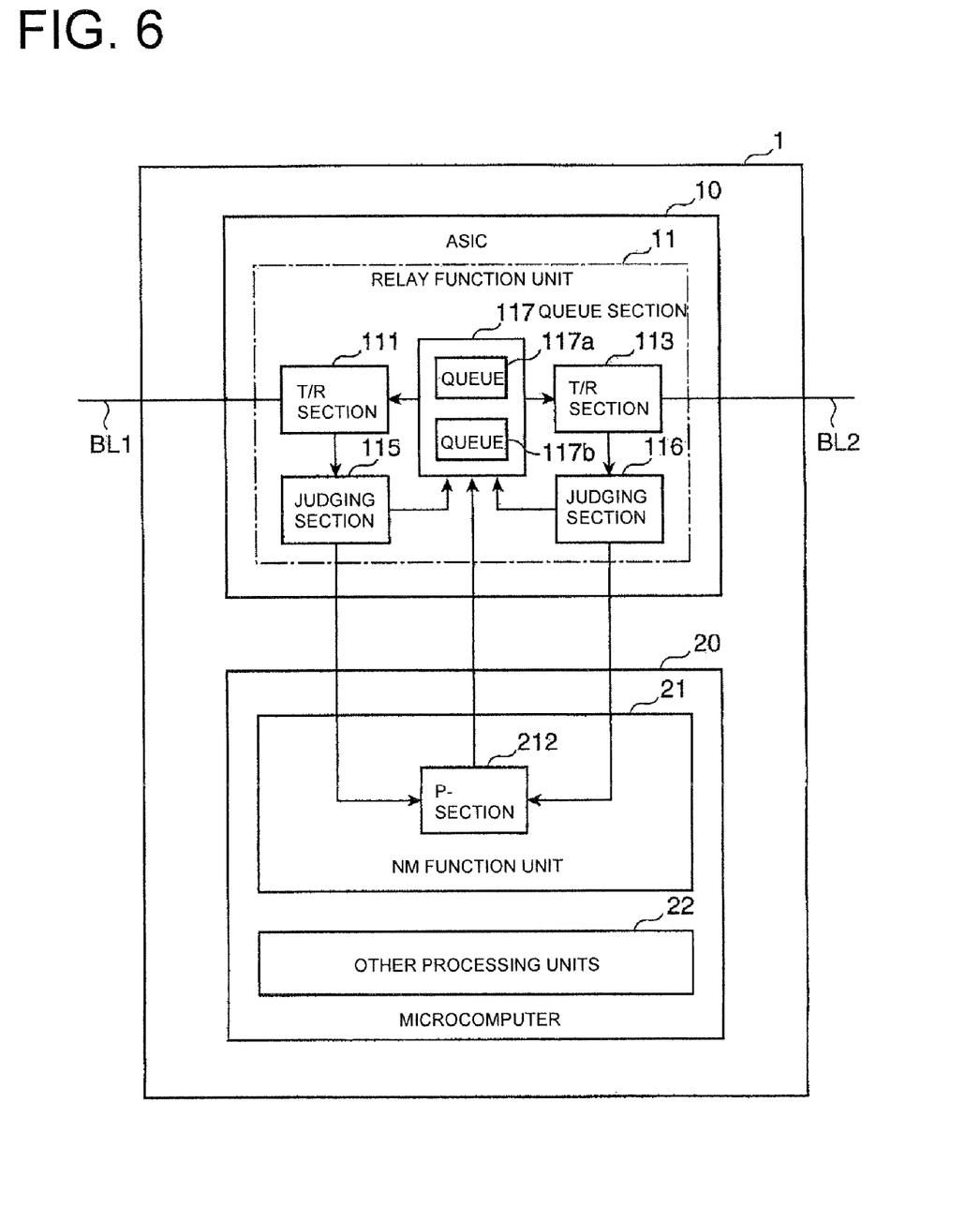
FIG. 6 is a block diagram of a vehicle gateway device according to a second embodiment of the invention.

FIG. 6 is a block diagram showing a vehicle gateway device 1 according to a second preferred embodiment of the present invention. This vehicle gateway device 1 is characterized in that only a relay function unit 11 receives communication data without a Network Management (NM) function unit 21 receiving communication data. In this embodiment, the similar or same parts as in the first embodiment are not described.

The relay function unit 11 of the vehicle gateway device 1 shown in FIG. 6 includes one or more transmitting/receiving sections 111, 113 (first transmitting/receiving section), one or more judging sections 115, 116 and at least one queue section 117. The judging section 115 reads communication data stored in a buffer of the transmitting/receiving section 111, judges or discriminates whether or not this communication data is relay data or NM data, and outputting the relay data to a queue 117b in the case of the relay data while outputting the NM data to a processing section 212 in the case of the NM data.

The judging section 116 reads the communication data stored in a buffer of the transmitting/receiving section 113, judges or discriminates whether this communication data is relay data or NM data, and outputs this relay data to a queue 117a in the case of the relay data while outputting the NM data to the processing section 212 in the case of the NM data.

The queue section 117 is for (temporarily or permanently) storing the relay data outputted from the judging section 115 or 116 and the NM data outputted from the processing section 212 and preferably includes the queues 117a, 117b. The queue 117a preferably is constructed by or comprises a First In First Out (FIFO) memory for storing the relay data and the network management data to be transmitted from the transmitting/receiving section 111. Specifically, the queue 117a stores the relay data outputted from the judging section 116, and also the NM data if the NM data received by the transmitting/receiving section 113 is outputted from the processing section 212.

The queue 117b preferably is constructed by or comprises a FIFO memory for storing the relay data and the network management data to be transmitted from the transmitting/receiving section 113. Specifically, the queue 117b stores the relay data outputted from the judging section 115, and also the NM data if the NM data received by the transmitting/receiving section 111 is outputted from the processing section 212.

The NM function unit 21 includes the processing section 212. The processing section 212 performs a NM process in accordance with the NM data outputted from the judging section 115 and outputs the NM data to the queue 117b. The processing section 212 also performs a NM process in accordance with the NM data outputted from the judging section 116 and outputs the NM data to the queue 117a.

Figure 7:
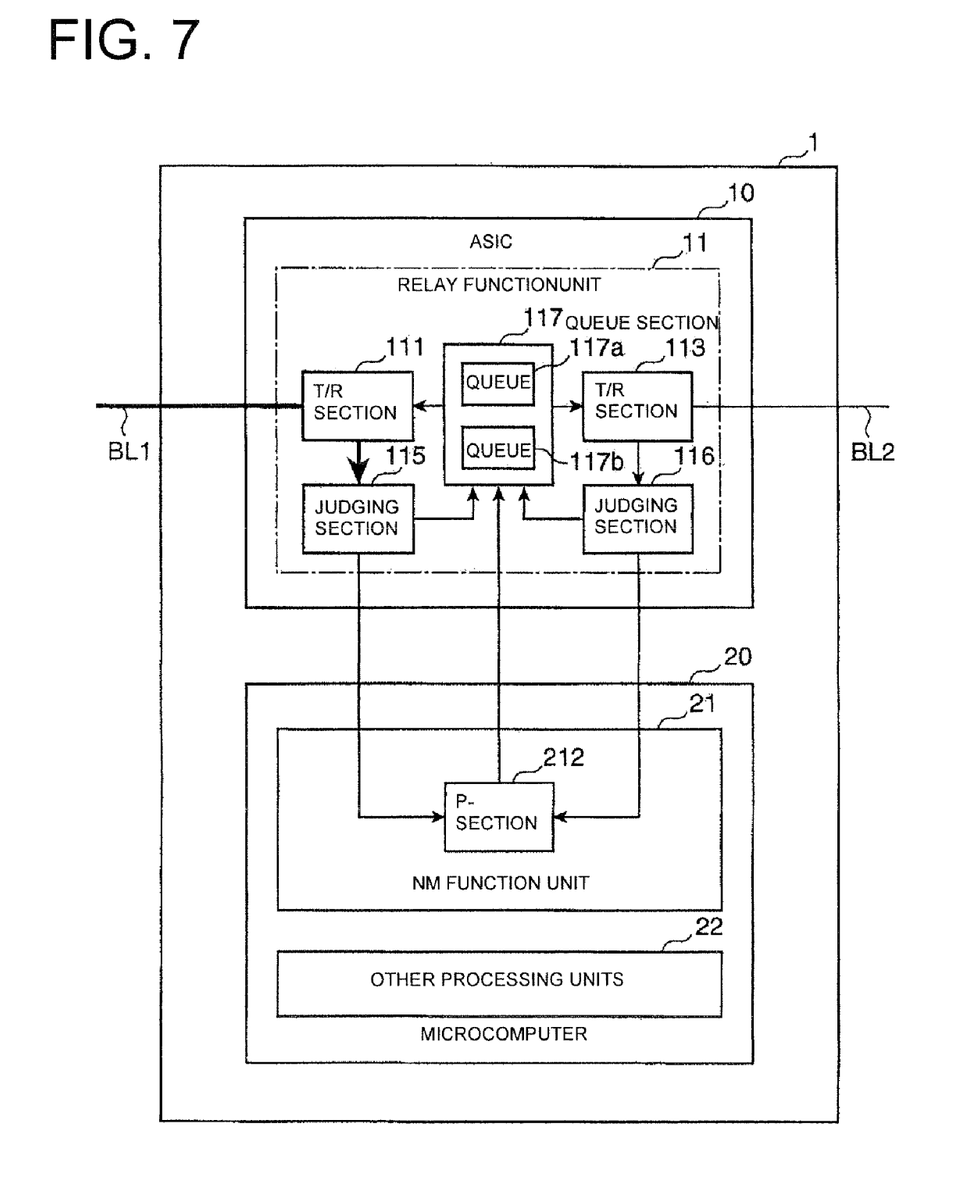
FIG. 7 is a diagram showing the operation of the vehicle gateway device according to the second embodiment.
Figure 8:
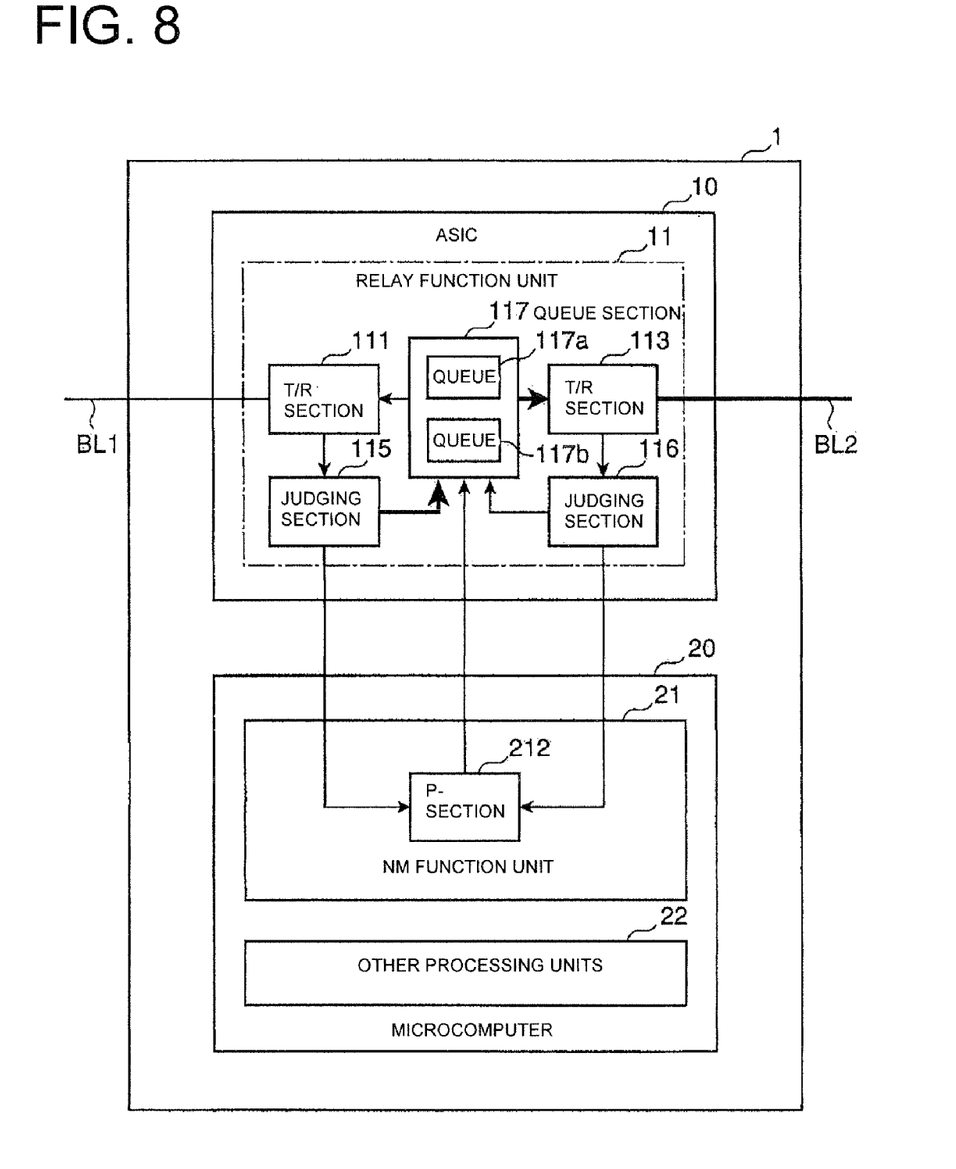
FIG. 8 is a diagram showing the operation of the vehicle gateway device according to the second embodiment.
Figure 9:
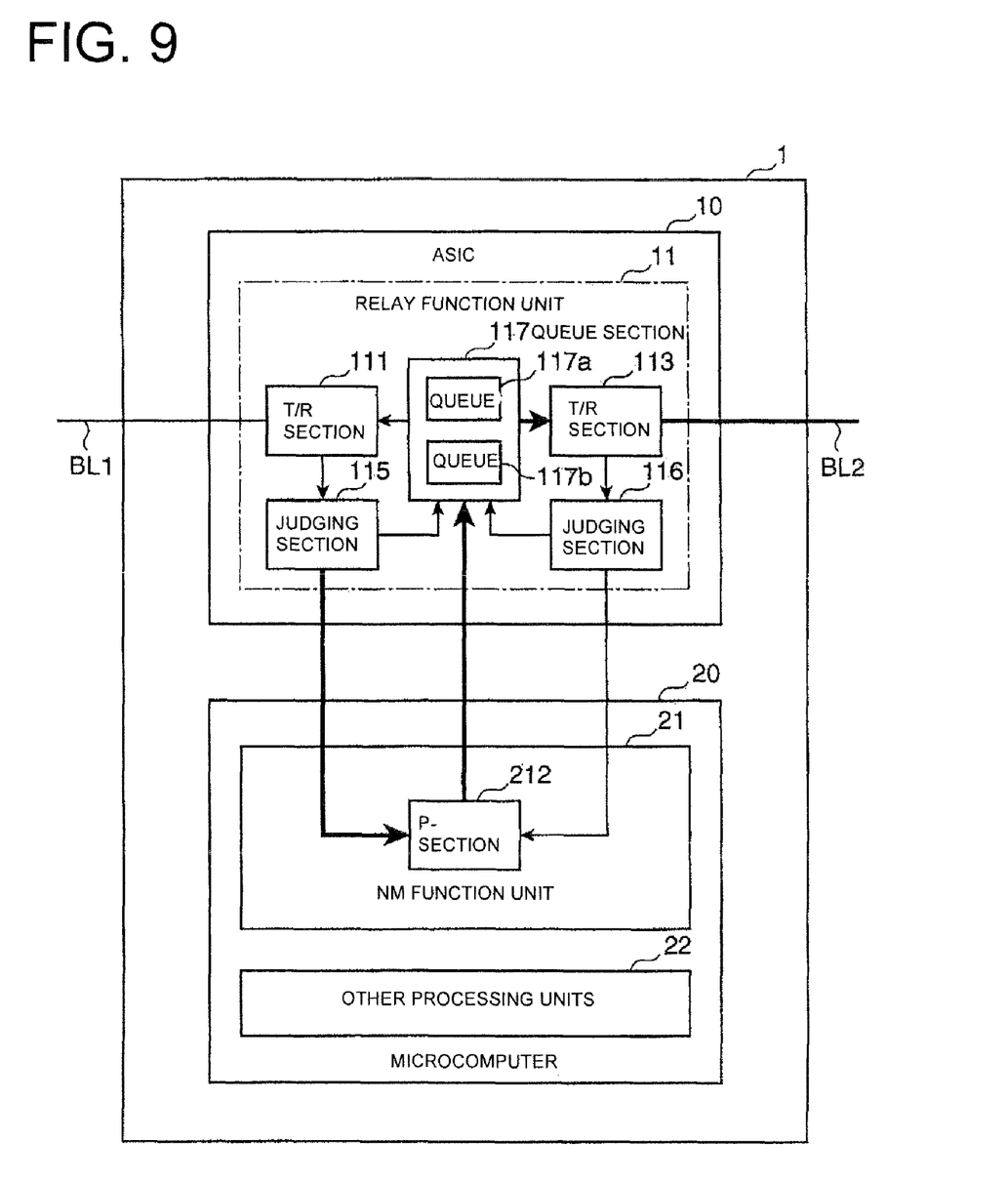
FIG. 9 is a diagram showing the operation of the vehicle gateway device according to the second embodiment.

Next, the operation of the vehicle gateway device 1 according to the second embodiment is described. FIGS. 7 to 9 are diagrams showing the operation of the vehicle gateway device 1, wherein FIG. 7 shows a state at the time of receiving communication data, FIG. 8 shows a state at the time of relaying the communication data and FIG. 9 shows a state at the time of performing the NM function. Thick lines in FIGS. 7 to 9 show a data flow.

First, if communication data flowing on the bus line BL1 is received by the transmitting/receiving section 111 and stored in the buffer as shown in FIG. 7, the judging section 115 reads the communication data stored in the buffer and judges whether or not this communication data is relay data or NM data. Subsequently, if the judging section 115 judges the reception of the relay data by the transmitting/receiving section 111 as shown in FIG. 8, this relay data is outputted to the queue 117b, which stores this relay data. Then, the transmitting/receiving section 113 transmits the relay data stored in the queue 117b to the bus line BL2 to relay the relay data.

On the other hand, if the judging section 115 judges the reception of the NM data as shown in FIG. 9, the NM data is outputted to the processing section 212, which performs a process in accordance with this NM data. If necessary, the processing section 212 may output this NM data to the queue 117b for storage, and the transmitting/receiving section 113 may read the NM data stored in the queue 117b and transmit it to the bus line BL2.

As described above, since the NM function unit 21 does not directly receive the communication data flowing on the bus lines BL1, BL2 in the vehicle gateway device 1 according to the second embodiment, it becomes possible to reduce the number of nodes present in the network. In other words, if the NM function unit 21 directly receives communication data flowing on the bus lines BL1, BL2 and the relay function unit 11 directly receives communication data flowing on the bus lines BL1, BL2, each of the network management function unit and the relay function unit is counted as one node. Accordingly, by providing the queue section 117 in the relay function unit 11 so that communication data are not directly received by the NM function unit 21, it becomes possible to reduce the node number by 1 and to reduce the node number in a vehicle network system with restriction on the node number.

Figure 10:
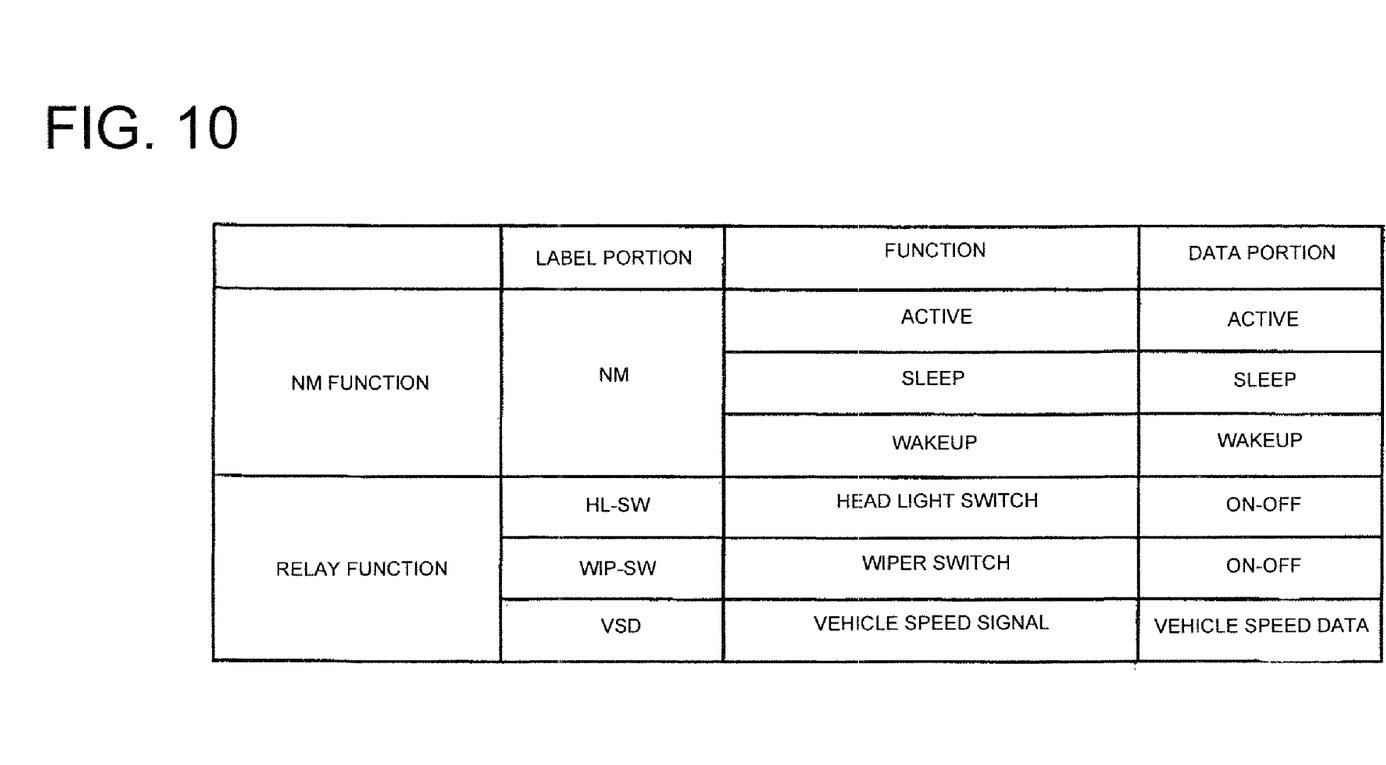
FIG. 10 is a chart showing types of data for a vehicle gateway device according to a third embodiment.

A characteristic feature of a vehicle gateway device 1 according to a third preferred embodiment different from the vehicle gateway devices 1 according to the first and second embodiments is that data to be stored in the label portion F1 shown in FIG. 1 is changed. In the third embodiment, the similar or same parts as in the first and second embodiments are not described. FIG. 10 is a chart showing types of communication data in the third embodiment. In the row of NM functions, "NM" is written for the label portion and data indicating the types of NM data such as "ACTIVE", "SLEEP" and "WAKEUP" are written for the data portion as shown in FIG. 10.

Thus, if the communication data is NM data, "NM" indicating that the communication data is NM data is stored in the label portion F1 shown in FIG. 2. Hence, the judging section 112 shown in FIG. 1 and the judging sections 115, 116 shown in FIG. 6 can judge that the communication data is NM data if "NM" is stored in the label portion F1 of the communication data, wherefore the process of judging whether or not the communication data is relay data or NM data can be simplified.

Specifically, if the types of communication data such as "ACTIVE" and "SLEEP" are stored in the label portion F1, the judging sections 112, 115, 116 need to prepare a table relating the types of communication data stored in the label portion F1 to data indicating that the communication data is NM data such as "ACTIVE"-"NM data" and "SLEEP"-"NM data" beforehand and to perform the process of judging whether or not the communication data is NM data in accordance with this table upon judging that "ACTIVE", "SLEEP" and the like are NM data. This complicates the process and requires a memory space for storing this table. However, by storing "NM" indicating that the communication data is NM data in the label portion F1, the judging sections 112, 115, 116 can quickly judge that this communication data is NM data if "NM" is stored in the label portion F1, whereby the process can be simplified. Further, the above table relating the types of the communication data to the data indicating that the communication data is NM data becomes unnecessary, thereby being able to save the memory of the ASIC 10. Merely three types of NM data are illustrated in FIG. 10, and four or more types of NM data may be actually present.

What is claimed is:

1. A vehicle gateway device to be connected with a bus line (BL), on which communication data flow, comprising:
    a relay function unit connected to a bus line (BL) of a vehicle network, for relaying communication data if communication data flowing on the bus line (BL) is relay data, the relay data being a command to control at least one device of a vehicle, the relay function unit constructed by an application specific integrated circuit, and
    a network management function unit connected to the relay function unit, for performing a network management process in accordance with network management data if communication data flowing on the bus line (BL) is network management data, the network management data transmitted for the implementation of a network management function of at least one node of the vehicle network and is outputted from the relay function unit, the network management function unit constructed by a microcomputer, the application specific integrated circuit and the microcomputer being disposed on a single device,
    wherein:
    the relay function unit includes a first transmitting/receiving section connected to the bus line (BL) for receiving communication data flowing on the bus line (BL) and transmitting the communication data to the bus line (BL), a judging section for judging whether the communication data received by the first transmitting/receiving section is the relay data or the network management data, and at least one queue for storing the relay data and the network management data, wherein
    the judging section of the relay function unit outputs the communication data judged to be the relay data to the queue of the relay function unit while outputting the communication data judged to be the network management data to the network management function unit, and the network management function unit performs the network management process in accordance with the network management data outputted from the judging section of the relay function unit.

2. The vehicle gateway device of claim 1, wherein the first transmitting/receiving section successively transmits the communication data stored in the queue to the bus line (BL).

3. The vehicle gateway device of claim 1, wherein the queue comprises a First In First Out (FIFO) memory for storing the relay data and the network management data to be transmitted from the transmitting/receiving section.

4. The vehicle gateway device of claim 1, wherein the communication data includes a label portion (F1) for storing data indicating the network management data and data indicating the type of the relay data.

5. A communication data control method of a vehicle gateway device for controlling communication data flowing on a bus line (BL), the vehicle gateway device including a relay function unit constructed by an application specific integrated circuit and a network management function unit constructed by a microcomputer, the application specific integrated circuit and the microcomputer being disposed on a single device, comprising the following steps:
    connecting the relay function unit to a bus line (BL) of a vehicle network;
    connecting the network management function unit to the relay function unit,
    receiving, by a first transmitting/receiving section of the relay function unit, communication data flowing on the bus line and transmitting the communication data to the bus line (BL),
    judging, by a judging section of the relay function unit, whether the communication data received is the relay data or the network management data, wherein the communication data judged to be the relay data are output to a queue of the relay function unit while outputting the communication data judged to be the network management data to the network management function unit,
    relaying communication data by means of the relay function unit, if communication data flowing on the bus line (BL) is judged to be the relay data, the relay data being a command to control at least one device of a vehicle, and
    performing a network management process in accordance with network management data by means of the network management function unit if communication data flowing on the bus line (BL) is judged to be the network management data transmitted for the implementation of a network management function of at least one node of the vehicle network and is outputted from the relay function unit.

6. The communication data control method of claim 5, wherein the communication data stored in the queue are successively transmitted to the bus line (BL).

7. The communication data control method of claim 5, wherein the communication data includes a label portion (F1)

for storing data indicating the network management data and data indicating the type of the relay data.

8. A computer program product comprising computer-readable instructions embodied on a non-transitory computer readable medium, and when executed on a processor performs a communication data control method comprising:

receiving, by a first transmitting/receiving section of a relay function unit connected to a bus line (BL) of a vehicle network, communication data flowing on the bus line (BL) and transmitting the communication data to the bus line the relay function unit constructed by an application specific integrated circuit (ASIC), judging, by a judging section of the relay function unit, whether the communication data received is the relay data or the network management data, wherein the communication data judged to be the relay data are output to a queue of the relay function unit while outputting the communication data judged to be the network management data to a network management function unit connected to the relay function unit, the network management unit constructed by a microcomputer, the application specific integrated circuit and the microcomputer being disposed on a single device, relaying communication data by means of the relay function unit, if communication data flowing on the bus line (BL) is judged to be the relay data, the relay data being a command to control at least one device of a vehicle, and performing a network management process in accordance with network management data by means of the network management function unit constructed by a microcomputer if communication data flowing on the bus line (BL) is judged to be the network management data transmitted for the implementation of a network management function of at least one node of the vehicle network and is outputted from the relay function unit.

* * * * *

UNITED STATES PATENT AND TRADEMARK OFFICE
CERTIFICATE OF CORRECTION

| | |
|---|---|
| PATENT NO. | : 8,077,733 B2 |
| APPLICATION NO. | : 12/133430 |
| DATED | : December 13, 2011 |
| INVENTOR(S) | : Tomoki Matsuo |

It is certified that error appears in the above-identified patent and that said Letters Patent is hereby corrected as shown below:

Title Page, Item (73) should read:

(73)  Assignee:  Sumitomo Wiring Systems, Ltd.

Signed and Sealed this

Seventh Day of February, 2012

David J. Kappos
*Director of the United States Patent and Trademark Office*